(12) United States Patent
Sahai et al.

(10) Patent No.: US 7,349,340 B2
(45) Date of Patent: Mar. 25, 2008

(54) SYSTEM AND METHOD OF MONITORING E-SERVICE QUALITY OF SERVICE AT A TRANSACTION LEVEL

(75) Inventors: Akhil Sahai, Santa Clara, CA (US); Vijay Machiraju, Mountain View, CA (US); Jinsong Ouyang, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1036 days.

(21) Appl. No.: 10/464,593

(22) Filed: Jun. 18, 2003

(65) Prior Publication Data

US 2004/0257985 A1 Dec. 23, 2004

(51) Int. Cl.
*H04L 12/22* (2006.01)

(52) U.S. Cl. .......................... 370/235; 705/1; 709/224

(58) Field of Classification Search ................ 370/229, 370/230, 230.1, 231, 234, 235; 709/228, 709/250, 232, 201, 200, 224; 705/1, 80
See application file for complete search history.

(56) References Cited

U.S. PATENT DOCUMENTS

| | | | | |
|---|---|---|---|---|
| 6,154,776 | A * | 11/2000 | Martin | 709/226 |
| 6,452,915 | B1 | 9/2002 | Jorgensen | |
| 6,560,230 | B1 * | 5/2003 | Li et al. | 370/395.42 |
| 6,661,775 | B1 * | 12/2003 | Nakayama et al. | 370/230.1 |
| 6,765,927 | B1 * | 7/2004 | Martin et al. | 370/469 |
| 6,795,406 | B2 * | 9/2004 | Kikinis | 370/286 |
| 6,868,061 | B1 * | 3/2005 | Kilkki et al. | 370/230.1 |
| 7,142,512 | B1 * | 11/2006 | Kobayashi et al. | 370/232 |
| 2002/0002579 | A1 | 1/2002 | Holden et al. | |
| 2002/0031103 | A1 * | 3/2002 | Wiedeman et al. | 370/316 |
| 2002/0046284 | A1 * | 4/2002 | Brabson et al. | 709/228 |
| 2002/0055999 | A1 * | 5/2002 | Takeda | 709/224 |
| 2002/0105910 | A1 * | 8/2002 | Maher et al. | 370/235 |
| 2002/0147656 | A1 | 10/2002 | Tam et al. | |
| 2004/0071084 | A1 * | 4/2004 | El-Hennawey et al. | 370/230 |
| 2004/0174823 | A1 * | 9/2004 | Steele et al. | 370/252 |
| 2004/0252696 | A1 * | 12/2004 | Kakishima et al. | 370/395.2 |
| 2006/0239288 | A1 * | 10/2006 | Posey, Jr. | 370/416 |

OTHER PUBLICATIONS

BestBuy.com, dated: May 23, 2001.*

* cited by examiner

*Primary Examiner*—Ricky Q. Ngo
*Assistant Examiner*—Ankit P Gandhi

(57) ABSTRACT

Quality of Service (QoS) management in a service-based system may be provided by adaptively adjusting system operational parameters in response to real time relationships between QoS specifications and measurements. A QoS manager may include a measurement engine configured to acquire real time data that is specific to transaction instances of various transaction types. The manager also may include a controller for comparing transaction data from the measurement engine to the guaranteed QoS standards. Depending upon the results of the comparison, the controller may invoke control actions.

23 Claims, 8 Drawing Sheets

SYSTEM AND METHOD OF MONITORING E-SERVICE QUALITY OF SERVICE AT A TRANSACTION LEVEL

TECHNICAL FIELD

The disclosure relates generally to systems and methods for measuring and controlling Quality of Service (QoS) in an electronic service environment and relates more particularly to managing QoS for a service-based system that hosts a number of different electronic services.

BACKGROUND ART

An electronic service (e-service) may be defined broadly as a service in which transactions are conducted via the global communications network referred to as the Internet. An e-service is designed for access by clients and by other e-services. An e-service may be considered a Web-based service, since it is typically accessible using a Uniform Resource Locator (URL) of the World Wide Web. An e-service may be a stand-alone, Web-based application created and hosted by the e-business (i.e., service provider) itself, or may be a Web-based application hosted for the e-business by a Web hosting enterprise, which may also be referred to as an "aggregator."

Whether the e-service is hosted by its e-business or by an aggregator, there is a need for specifying Service Level Agreements (SLAs) and for measuring compliance. For a stand-alone e-service, the SLA would be an agreement between the clients and the e-business. On the other hand, SLAs for aggregators are twofold, since there are agreements between the service provider and its clients and agreements between the service providers and the hosting aggregator. Compliance is a measure of the Quality of Service (QoS) provided to the clients and the QoS provided to the e-business. While the prior art approaches to managing QoS provide relevant information regarding these metrics, the measuring and control can be more focused.

SUMMARY OF THE INVENTION

Quality of Service (QoS) management is provided for a service-based system by utilizing a measurement engine that is configured to acquire data specific to transaction instances of different transaction types during executions of various services, where the services are defined by different sets of the transaction types. The measurement engine is enabled to generate transaction data indicative of individual measures relating to processing for particular transaction instances. The transaction data may be indicative of aggregate measures relating to processing for a number of the transaction instances. The measurement engine is in communication with a controller which may be enabled to compare the transaction from the measurement engine with predefined QoS standards. Moreover, the controller may be enabled to adaptively adjust operational parameters of the monitored service-based system in response to current relationships between the transaction data and the predefined QoS standards.

DETAILED DESCRIPTION

Figure 1:
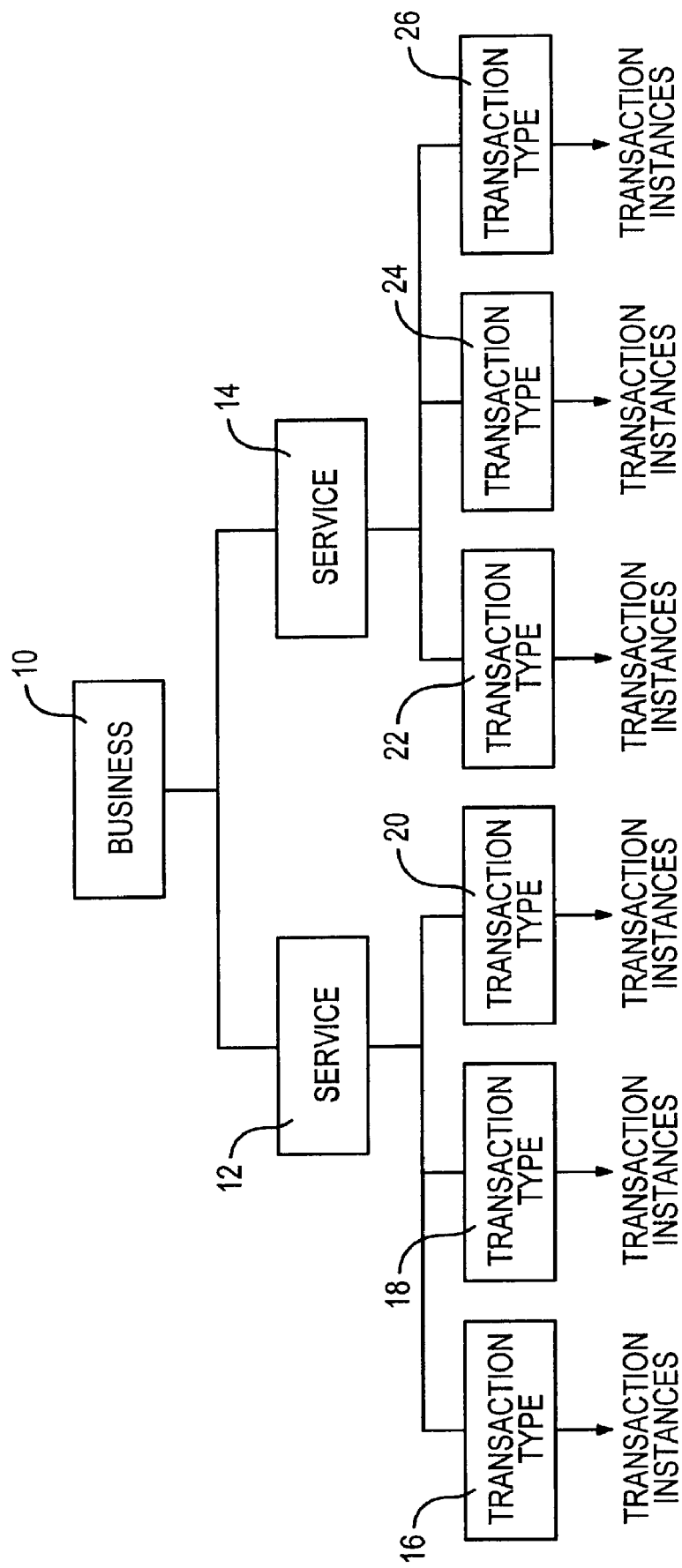
FIG. 1 is a schematic view of an e-business that offers two e-services.

A schematic representation of an e-business environment is shown in FIG. 1. A business entity 10 is shown as offering two different services 12 and 14. Each service is an instance of a particular e-service type which is defined by a set of transaction types 16, 18, 20, 22, 24 and 26. Thus, the e-service 12 is comprised of three transaction types 16-20, while the e-service 14 is comprised of a different set of transaction types 22-26. The transaction types of the two e-service instances are not necessarily mutually exclusive. That is, a transaction of the first set of transaction types 16-20 may be identical to a transaction of the second set of transaction types 22-26. Each invocation of a transaction type is a transaction instance.

As one example, the business 10 may be a corporation that sells books via the Internet. Thus, the service type instance 12 is bookselling. While only three transaction types 16,18 and 20 are shown as defining the bookselling service 12, the transactions that are supported may include the types "login," "browse," "add to cart," and "buy."

Some e-businesses 10 have distinct URLs for different transaction types 16-26. However, most e-services are associated with a single URL through which requests are received, often in the form of XML documents. Only the contents of the documents are different from one transaction request to another. In such a case, the business transaction types cannot be presumed merely by measuring HTTP level invocations. Moreover, a single e-service transaction may necessitate multiple HTTP request response cycles. As a consequence, business level transactions are often distinct from a single HTTP request response.

While the number of "hits" to a Web site is of interest to an e-business, the greater interest is in maximizing revenue and in guaranteeing that clients are able to interact with the e-service while receiving good performance. Similarly, clients are interested in response times and in their own perceptions of satisfactory service, which may be termed Quality of Experience (QoE).

Figure 2:
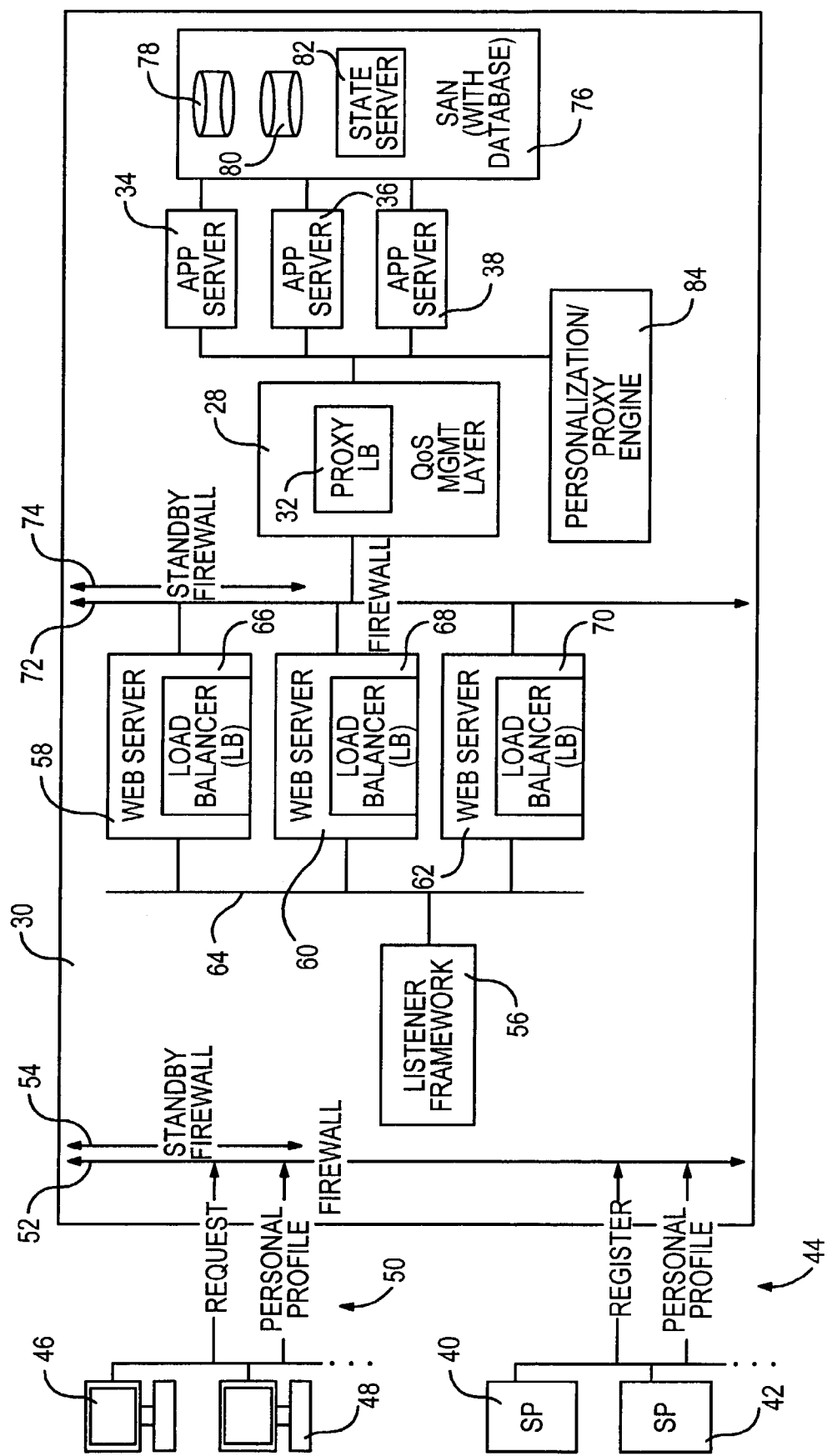
FIG. 2 is a block diagram of an example of a service-based portal having a QoS management system in accordance with one embodiment of the invention.

FIG. 2 illustrates one possible distributed system in which the invention may be used. In this embodiment, a Quality of Service (QoS) management layer 28 is shown as being a component of an e-business portal 30, such as a J2EE (Java 2 Platform, Enterprise Edition) compliant portal. The QoS management layer 28 includes a proxy load balancer 32 which aids in balancing the transaction processing load among a number of available application servers 34, 36 and 38. Other components of the QoS management layer will be described when referring to FIGS. 3 and 8.

Each application server 34 includes programming for hosting any of a number of different e-services. Merely by example, the e-services may include online bookselling and online travel reservations. The portal 30 may be an aggregator (i.e., hosting site) for multiple service providers 40 and 42. During an initialization stage, a service provider registers with the portal and enters a personal profile, as indicated by processes 44. The processes represent interactions via the Internet, but other modes of communication may be substituted. The personal profile includes specifications that define the SLA for the particular service provider 40 or 42. As previously described, the SLA will include QoS agreements between the aggregator and the service provider, as well as agreements between the service provider and clients, which are represented by computer systems 46 and 48. The clients communicate with the portal 30 via the Internet. Each client may be required to enter a personal profile. In accessing the various e-services, clients transmit requests and receive responses, as is well known in the art. These Internet communications are partially represented by processes 50.

The portal 30 is shown as including both a primary firewall 52 and a standby firewall 54. The standby firewall may automatically detect failure of the primary firewall in order to ensure that security rules and attributes are maintained in the event of a primary firewall failure. The portal may also include a listener framework 56, which may enable the identification of communications in any number of different protocols, such as HTTP, HTTPS, SMTP and the like.

The listener framework 56 and three Web servers 58, 60 and 62 are connected to a bus system 64. Each Web server may include a load balancer 66, 68 and 70. The three load balancers are proxied by the proxy load balancer 32 of the QoS management layer 28, which forwards requests to the application servers 34, 36 and 38 in the application server cluster. Communications between the Web servers and the QoS management layer are directed through a second primary firewall 72 and a second standby firewall 74.

In the example embodiment shown in FIG. 2, the application servers 34, 36 and 38 access a Storage Area Network (SAN) 76 with standby databases 78 and 80 for storing user data. User session states are stored in a state server 82 that is maintained on the SAN. Finally, a personalization/proxy engine 84 may be used to store personal profiles and other information regarding the clients 46 and 48, the service providers 40 and 42, and the operation of the system.

The QoS management layer 28 includes a manager that lies between the load balancers 66, 68 and 70 of the Web servers 58, 60 and 62 and the proxy load balancer 32 which is connected to the application servers 34, 36 and 38. The manager is adapted to collect management information in real time concerning service level transactions and to "guarantee" agreed upon QoS levels. A QoS approach based on service level transactions may be highly appropriate for e-businesses, which are typically interested in higher level metrics than those that are conventionally monitored in guaranteeing QoS. A service provider 40 and 42 (e-business) is interested in maximizing revenue and in guaranteeing that clients receive proper performance. Similarly, clients 46 and 48 are interested in response times and in their own perceptions of satisfactory service (i.e., also known as Quality of Experience (QoE)). The QoS management layer 28 is intended to specify, measure and dynamically "guarantee" such metrics for e-service providers and clients. The dynamic adjustments of operational parameters are performed in real time, since the QoS management layer is able to identify and at least partially remedy degradation with respect to (1) performance of transactional instances, (2) availability of resources to execute the transactional instances, and (3) reliability in successfully executing the transaction instances.

As was described with reference to FIG. 1, a particular e-service 12 consists of a set of transaction types 16, 18 and 20. As an example, the e-service may be online bookselling, while the transaction types may include "login," "browse," "add to cart," and "buy." The transaction instances are actual invocations of the transaction types.

Figure 3:
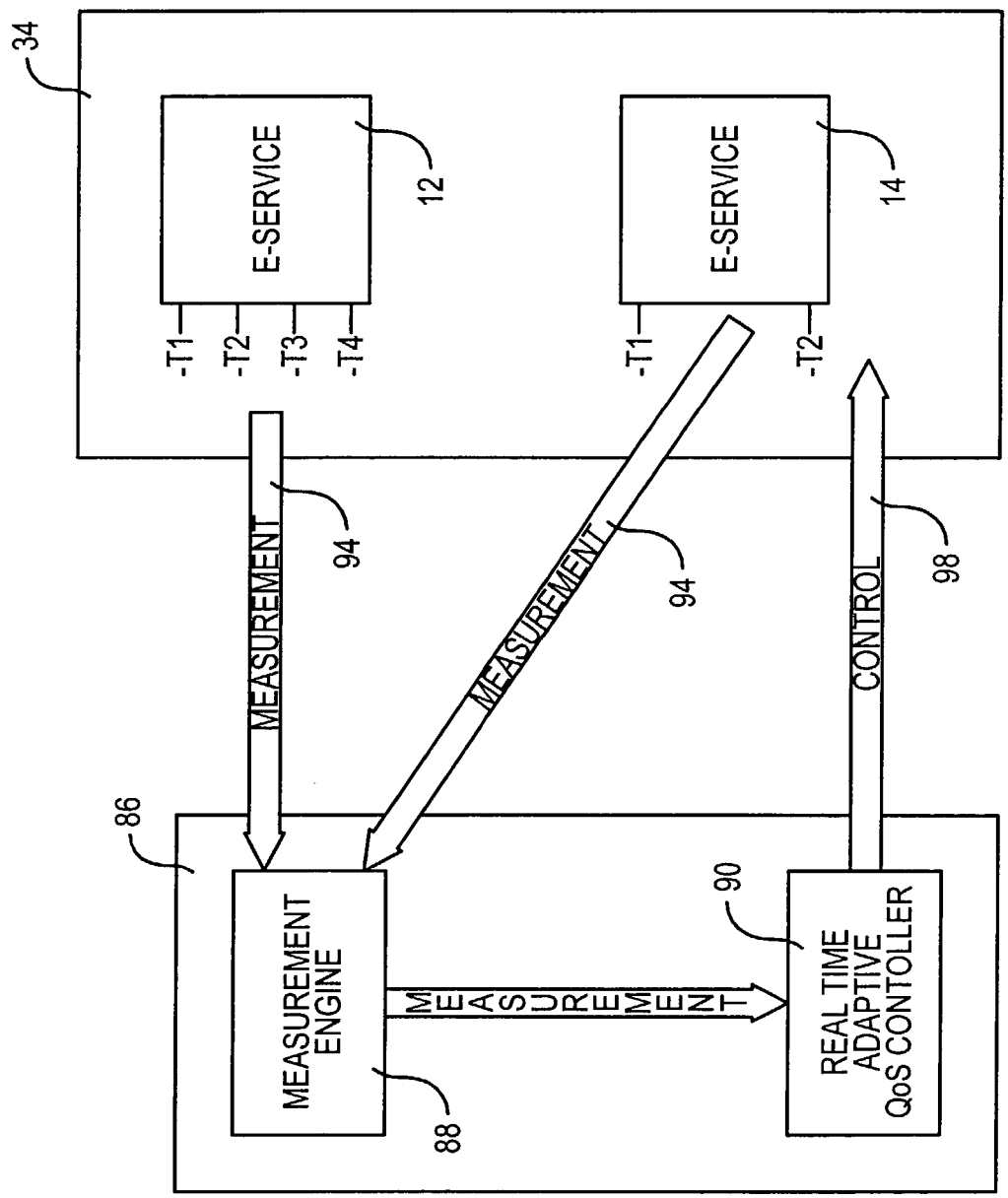
FIG. 3 is a block diagram of a representation of the QoS management system of FIG. 2.
Figure 4:
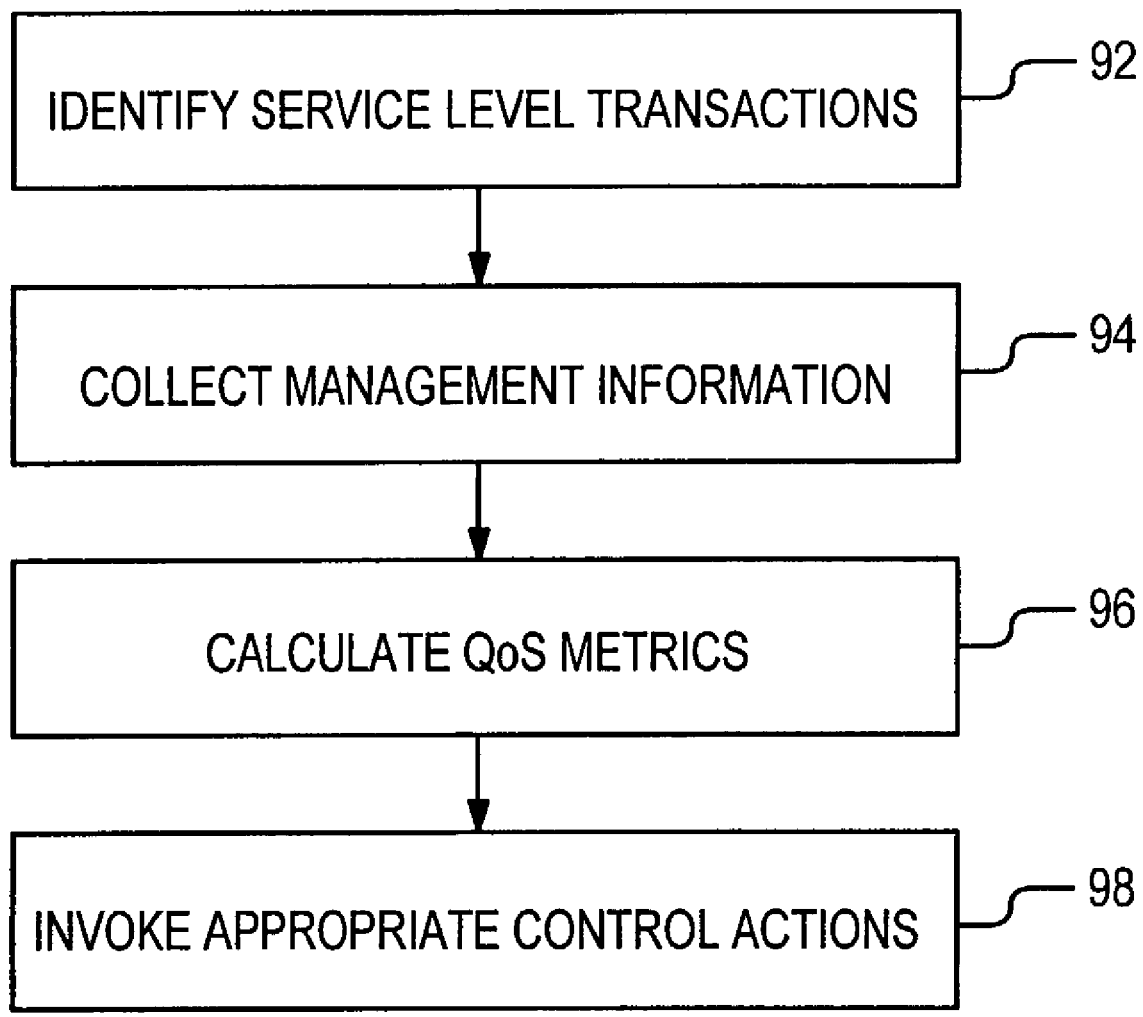
FIG. 4 is a process flow of steps for providing QoS management in accordance with embodiments of the invention.

FIG. 3 is a schematic representation of the processing in accordance with the invention, and FIG. 4 is an overview of applicable steps. The application server 34 hosts at least two e-services 12 and 14. The manager 86 of the QoS management layer includes a measurement engine 88 and a real time adaptive QoS controller 90. The measurement engine and controller are cooperative to identify service level transactions (step 92), collect management information (step 94), calculate the QoS metrics (step 96), and invoke the appropriate control actions (step 98).

At step 92, the transactions can be identified at the application level, either intrusively or non-intrusively. Non-intrusive instrumentation does not require changes to the application and does not require designing the application with the management options in mind. Non-intrusive identification of transactions may be invoked by discretely monitoring the HTTP requests and responses and by mapping the requests and responses to service level transactions. As another possibility, the logs of the Web servers 58, 60 and 62 of FIG. 2 may be monitored and the information may be used to map HTTP requests/responses to service level transactions.

Intrusive identification of service level transactions may be enabled in a number of different ways. As one possibility, application programming interfaces (APIs) may be used to enable identification of transaction start and end times. Application specific information can also be maintained at the transaction level. An Application Response Measurement (ARM) and an extension Arm (XARM) can be used for identifying transaction types, transaction instances, and service instance level correlations. The raw data that is collected may include response times, failures and abort counts for transactions and breakdowns for the component transactions at both the type level and the instance level.

In the step 92 of identifying service level transactions, the different transaction types must be differentiated. An e-service will have well-defined transaction types, such as the "login," "search" and other transaction types of a bookselling e-service. An e-business would prefer to distinguish these transactions in a hierarchy of higher and lower priorities. For example, transactions such as "add to cart" and "buy" would be given a higher priority, since they are more closely connected to maximizing revenue. The prioritization of transaction types significantly increases the flexibility of the manager 86 in achieving the goals of the service providers 40 and 42.

The steps 94 and 96 of collecting the management information and calculating the QoS metrics will be described in detail below. The available control actions to be invoked at step 98 will depend upon the application, but should include at least two of three of (1) varying the load distribution among application servers, (2) varying the pool of application servers currently hosting an e-service, and (3) providing graceful degradation in the case of a "meltdown." The QoS manager 86 collects the data from the various application servers 34, 36 and 38, uses the measurement engine to calculate QoS metrics, and compares the calculated QoS metrics to the specified QoS requirements, so as to determine the appropriate control actions.

Figure 5:
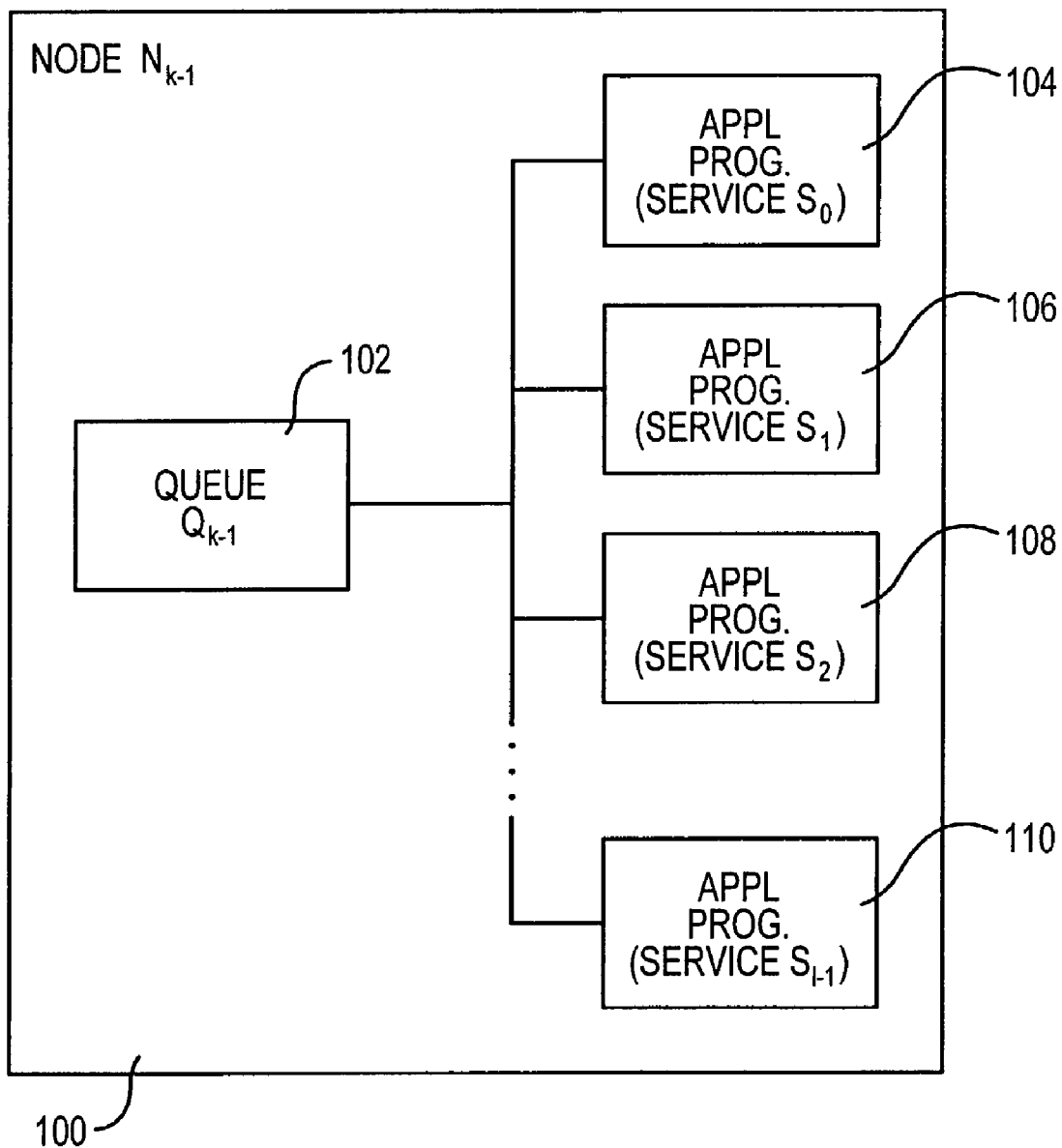
FIG. 5 is a block diagram of one of the application servers of FIG. 2.

The control action of dynamically adjusting the load distribution among the application servers 34, 36 and 38 can be invoked by redefining the sending of transaction requests to different queues of the different application servers for processing. This load redistribution is at least partially based on the current node capacities of the application servers. The proxy load balancer 32 of FIG. 2 is used in the load balancing. Referring briefly to FIG. 5, each application node 100 may include a queue 102 that handles requests/responses for the application programs 104, 106, 108 and 110 that the server is able to host. Alternatively, the queue 102 may be a component of the QoS management layer 28 of FIG. 2. Load distribution may be controlled by adjusting weights for particular transaction types on the queues.

For the control action of varying the number of application servers able to host a particular e-service, the variability may be provided by a pool of standby/failover servers that are able to handle a detected increase in load. Nodes (servers) can also be retired/removed for planned or unplanned shutdowns. This enables handling of situations in which particular nodes fail or are oversaturated. Dynamic capacity allocation may also be achieved by assigning particular application nodes to primarily host particular application programs 104, 106, 108 and 110, but to activate dormant application programs of the other application nodes when the primary application node is oversaturated.

In the control action of graceful degradation, the transactions are prioritized and control is exerted over the number of transaction instances of a particular transaction type that can be executed on a specific node. Where a graceful degradation is required, the controller 90 of FIG. 3 may determine control of particular nodes over certain transaction types, while other transaction types are allowed to be dropped.

The determination of the appropriate control action at step 98 of FIG. 4 may be based on decision-making algorithms using real time measurements. A theoretical model on which the QoS management layer is built in order to specify, measure and guarantee QoS in a distributed system assumes that the system consists of a number of homogeneous or heterogeneous computing nodes. Another assumption is that the various application programs 104-108 in FIG. 5 can be replicated on one or more nodes and that running of each replica will produce the same result. It is also assumed that applications are running two service requests, which may be received from the outside world or from within the distributed system. Finally, in the model which will be described, it is assumed that each node 100 logically has a queue 102 to buffer the incoming requests for potentially different services.

Figure 6:
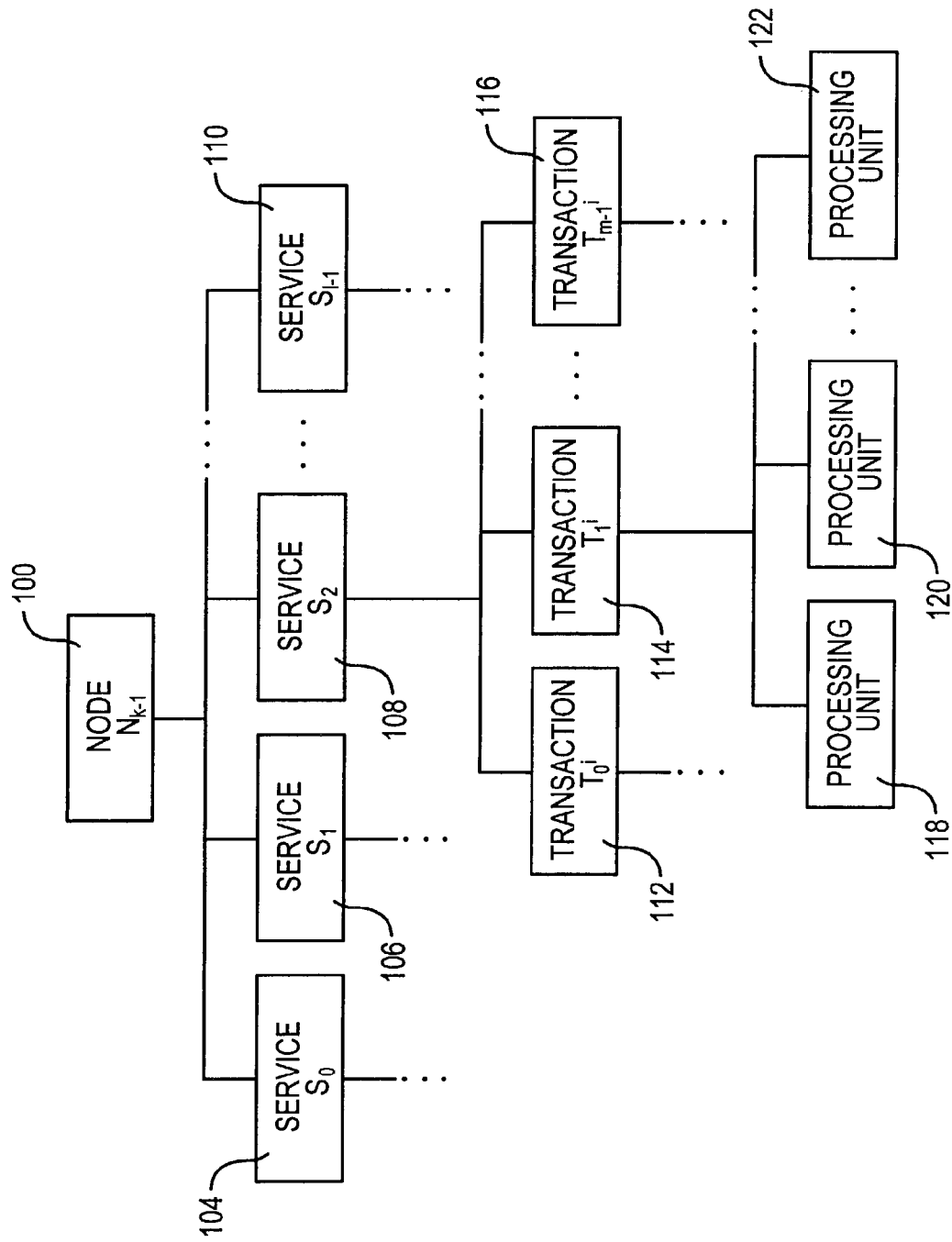
FIG. 6 is a schematic representation of e-service levels relevant to embodiments of present invention.

Referring now to FIGS. 5 and 6, the nodes 100 in the distributed system are defined as $\{N_0, N_1, \ldots, N_{k-1}\}$, where k is the number of nodes. The queue 102 associated with node $N_1$ is defined as $Q_i(0 \leq i \leq k-1)$. Application programs 104, 106, 108 and 110 hosted in the system are termed services, and the set of hosted services as $\{S_0, S_1, \ldots, S_{l-1}\}$, where l is the number of services currently hosted in the system. Each service $S_i(0 \leq i < l)$ can be replicated on the multiple nodes, and a replica is defined as $S_i^n$, where n is the index of the hosting node. A service may provide a number of functions (i.e., transactions 112, 114 and 116), and each function may consist of one or more processing units 118, 120 and 122. A "transaction" is the processing units that correspond to a service request. For each service $S_i, 0 \leq i < l$), its supported transactions are defined as $\{T_0^i, T_1^i, \ldots,$ $T_{m-1}^i\}$, where m is the number of transactions implemented in the service. For each transaction $T_j^i (0 \leq j < m)$, its incarnation on node $N_n$ is defined as $T_j^{i,n}$, where j identifies the type of the transaction ($T_j^i$), i represents the service implementing the transaction ($S_i$), and n is the index of the node where the transaction/service is replicated.

While node, service and transaction represent three different levels of granularity for modeling QoS in a distributed system, specification, measurement and control are three interdependent phases for the QoS management. Those three phases will be described in the sections that follow.

Specification

As noted when referring to FIGS. 2, 3 and 4, a quality of service specification is a set of agreements which can contain performance, scalability, availability and reliability objectives. These specifications are used by the QoS management layer 28 for monitoring compliance, so that appropriate control actions can be taken to meet the specifications. Clients 46 and 48, on the other hand, use the specification to expect a certain level of service from the servers.

The set of agreements in the specification are negotiated at both service and transaction levels. The QoS specification for a service consists of the following parameters.

"Service Priority," which is described by the equation:

$$S.priority = P, 0 \leq P \leq 1$$

More computing resources will be allocated for a service with a higher priority than that for a lower priority service. For instance, a high priority could mean the service will have a higher degree of replication, or will be hosted on more powerful nodes.

"Availability" is described by the formula:

$$S.availability = \frac{U}{l} 100\%$$

where l is a specific time interval and U is the least amount of uptime expected from a service during an interval. This parameter specifies the agreement on the percentage of the uptime for a service.

"Reliability" can be described by the formula $$S.reliability = \frac{C_c}{C_t} 100\%$$

This definition means that, for every $C_t$ number of transactions initiated by a service, it is expected that at least $C_c$ number of transactions will successfully be finished. Thus, reliability is the rate of successfully finished transactions for a service.

As described above, a service consists of a list of transactions it supports. The QoS specification for a transaction in a service contains the following parameters.

"Transaction Priority." The priority of a transaction is defined as:

$$T.priority = P, 0 \leq P \leq 1$$

T.priority has the same semantics as S.priority. The priorities for transactions should be set up to meet the following requirements: (1) The priority of any transaction in a service is no higher than the service's priority, and (2) The priority of any transaction in the first service is lower than that of any transaction in the second service if the first service has a lower priority. That is, $$T_j^i.\text{priority} \leq S_i.\text{priority}$$

and $$S_i.\text{priority} \prec S_k.\text{priority } T_j^i.\text{priority} \prec T_l^k.\text{priority}$$

"User Priorities." For each type of transaction, there may be different categories of users with different priorities. The user priorities for a type of transaction can be specified as:

$$\{T.\text{user}_u.\text{priority} = P, 0 \leq P \leq 1 | u = 0, 1, \ldots, U-1\}$$

The priorities for user categories should be set up to meet the following requirements: (1) The priority of any user category with a transaction type is no higher than the transaction's priority, and (2) The priority of any user category with the first transaction type is lower than that of any user category with the second transaction type if the first transaction type has a lower priority. That is, $$\forall u, T_j^i.\text{user}_u.\text{priority} \leq T_j^i.\text{priority}$$

and $$T_j^i.\text{priority} \prec T_l^k.\text{priority } \forall u, T_j^i.\text{user}_u.$$
$$\text{priority} \prec T_l^k.\text{user}_u.\text{priority}$$

"Transaction Response Time," "Transaction Density," and "Compliance Rate." For each type of transaction with a specific service and a user category, its performance requirement can be described using these three parameters. That is, under a certain transaction density on a node, there should be at least the percentage of transactions, specified by the compliance rate, which does not violate the response time requirement. The three parameters are related to each other, and are given by:

$$T.\text{resptime} = R, 0 \leq R < \infty \text{ and } T.\text{density} = \frac{C}{I} \text{ and}$$
$$T.\text{compliance} = \mu, 0 \leq \mu \leq 1$$

where C is the number of Ts instances initiated during a measurement interval l. T.resptime specifies the average response time expected from a type of transaction. It is the waiting time in the queue plus the service time on the node. T.density specifies the maximum transaction density (i.e., the number of concurrent transactions per time unit) to be allowed on a specific node, such that at least T.compliance percent of transactions whose response times are no greater than T.resptime, T.density, and T.compliance can usually be obtained through capacity planning on the computing nodes in the system. As the nodes may be heterogeneous, the values of T.density depend on the capacity of the hosting nodes—each hosting node has its own agreement on transaction density.

The techniques for calculating the density for a type of transaction on a specific node hosting multiple types of transactions will now be identified.

"Availability" is described by the formula:

$$T.\text{availability} = \frac{U}{I} 100\%$$

where l is a specific time interval, and U is the least amount of uptime expected from a type of transaction during an interval. This parameter specifies the agreement regarding the percentage of the uptime for a type of transaction. A service is termed as being unavailable if each of its hosted transactions is unavailable.

"Reliability" is defined as:

$$T.\text{reliability} = \frac{C_c}{C_t} 100\%$$

This definition means that, for every $C_t$ number of Ts instances being initiated, it is expected that at least $C_c$ number of instances will successfully be finished. That is the rate of successfully finished transactions for a transaction type. The reliability requirement of a service should be the lower bound of that of its hosted transactions.

Measurement

The set of metrics needed to be collected and calculated at transaction, service and node levels will now be set forth. These metrics are used to check if there are any violations on the QoS agreements or irregularities in the system. There are two types of metrics: raw and aggregate data. The metrics will be presented in the next section, while the following section will describe how the metrics can be used to provide better quality of service, or reinforce the QoS agreements in the event of violations.

Raw Metrics

"Transaction registration time" is the time when a type of transaction is registered/initiated in a service. It is described by $T_j^{i,n}.\text{regtime}$.

"Transaction failed time" is the time when a type of transaction becomes unavailable in a service. It is described by $T_j^{i,n}.\text{failedtime}$.

"Transaction start and stop times." Transaction start/stop time marks the start/stop time of a transaction instance. They are given by $T_{j,k}^{i,n}.\text{startime}$ and $T_{j,k}^{i,n}.\text{stoptime}$. After its start, the status of the instance is marked "in-progress" until it stops, either successfully ("committed") or in failure ("failed").

"Transaction Duration." A finished transaction instance has a duration between its start and its stop. For a transaction that is still in-progress at the end of a measurement interval, this measure is the duration between its start and the end of the interval. Thus, $t_{j,k}^{i,n}.\text{stime}$ is described by:

$$t_{j,k}^{i,n}.\text{stime} = \begin{cases} t_{j,k}^{i,n}.\text{stoptime} - t_{j,k}^{i,n}.\text{startime}, & t_{j,k}^{i,n}.\text{status} = \text{committed or failed} \\ \text{intvl.end} - t_{j,k}^{i,n}.\text{startime}, & t_{j,k}^{i,n}.\text{status} = \text{inprogress} \end{cases}$$

Aggregate Metrics

Aggregate metrics are derived from the basic raw metrics described in the previous section. The aggregate metrics are used by the QoS controller to monitor the node, transaction and service level details and to take certain control actions. The aggregate metrics calculated for this purpose are:

"Transaction Down Time." The down time of a type of transaction is given by:

$$T_j^{i,n}.dtime = T_j^{i,n}.regtime - T_j^{i,n}.failedtime$$

$T_j^{i,n}.failedtime$ represents the time when the resource (i.e., the software implementing the transaction or the node hosting the transaction) fails. $T_j^{i,n}.regtime$ is the time when the resource is back up (i.e., when the type of transaction is re-registered).

"Transaction Residence Count" represents the number of transactions of a specific type existing during a measurement interval. It consists of the transactions starting before and within the interval. The residence count of a service transaction on a node is defined as:

$$T_j^{i,n}.residence = T_j^{i,n}.prev\_start + T_j^{i,n}.curr\_start$$

"Transaction Residence Time" is the average time for which a type of transaction resides in a measurement interval. It is described by:

$$T_m^{i,n}.etime = \frac{t_{j,k}^{i,n}.etime}{T_j^{i,n}.residence}$$

$t_{j,k}^{i,n}$ is a transaction instance that exists during the measurement interval. $t_{j,k}^{i,n}.etime$ represents the amount of time that $t_{j,k}^{i,n}$ spends in the interval, and is described by:

$$t_{j,k}^{i,n}.etime = \begin{cases} t_{j,k}^{i,n}.stoptime - t_{j,k}^{i,n}.startime, [t_{j,k}^{i,n}.startime, t_{j,k}^{i,n}.stoptime] \subset intvl \\ t_{j,k}^{i,n}.stoptime - intvl.start, t_{j,k}^{i,n}.startime \subset intvl.start \\ intvl.end - t_{j,k}^{i,n}.startime, t_{j,k}^{i,n}.status = inprogress \text{ and } t_{j,k}^{i,n}.startime \geq intvl.start \\ intvl.end - intvl.start, t_{j,k}^{i,n}.status = inprogress \text{ and } t_{j,k}^{i,n}.startime < intvl.start \end{cases}$$

"Transaction Waiting Time." The waiting time of a transaction indicates the amount of time for which the corresponding request waits in the queue before being serviced. The transaction waiting time on node $N_n$ is calculated by the following, where $Q_n.length$ represents the average length of $Q_n$.

$$T_j^{i,n}.wtime = \frac{(intvl.end - intvl.start) * Q_n.length}{(T_k^{i,n}.curr\_start)}$$

"Transaction Commit Count." $T_j^{i,n}.commit$ represents the number of transactions of a specific type that finished successfully during a measurement interval.

"Transaction Violated Commit Count." $T_j^{i,n}.violation$ counts the number of transactions of a specific type that finished successfully, but that violate the response time requirement, which is:

$$t_{j,k}^{i,n}.stime + T_j^{i,n}.wtime > T_j^i.resptime$$

"Transaction In-progress Count." $T_j^{i,n}.inprog$ counts the number of on-going transactions of a specific type by the end of a measurement interval.

"Transaction Violated In-progress Count." $T_j^{i,n}.vinprog$ counts the number of on-going transactions of a specific type whose durations, by the end of a measurement interval, violate the response time requirement, which is also:

$$t_{j,k}^{i,n}.stime + T_j^{i,n}.wtime > T_j^i.resptime$$

"Transaction Failed Count." $T_j^{i,n}.failed$ counts the number of transactions of a specific type that failed during a measurement interval.

"Transaction Service Time" is the average duration for the set of transaction instances with a specific type during a measurement interval. Each instance in the set meets the following condition:

$$\forall i, j, k, t_{j,k}^{i,n}.status = committed, \text{ or } t_{j,k}^{i,n}.status$$
$$= inprogress \text{ and } t_{j,k}^{i,n}.stime +$$
$$T_j^{i,n}.wtime > T_j^i.resptime$$

$t_{j,k}^{i,n}$ is a transaction instance that either finishes successfully within the interval, or is still in-progress at the end of the interval, whereas it has violated the response time agreement. The average transaction service time is thus given by:

$$T_j^{i,n}.stime = \frac{t_{j,k}^{i,n}.stime}{T_j^{i,n}.commit + T_j^{i,n}.vinprog}$$

"Transaction Response Time" is the sum of transaction service time and transaction waiting time (i.e., the average time spent by a type of request on a node). It is defined as:

$$T_j^{i,n}.rtime = T_j^{i,n}.stime + T_j^{i,n}.wtime$$

"Transaction Violation Rate" represents the percentage for a type of transaction whose instances violate the response time agreement during a measurement interval.

$$T_j^{i,n}.vrate = \frac{T_j^{i,n}.violation + T_j^{i,n}.vinprog}{T_j^{i,n}.commit + T_j^{i,n}.vinprog}$$

"Absolute transaction density" for a type of transaction is the average number of concurrent transactions per time unit. It is defined as:

$$T_j^{i,n}.adensity = \frac{T_j^{i,n}.residence}{intvl.end - intvl.start}$$

"Absolute transaction load." The absolute transaction load of a type of transaction is the total residence time for such type of transaction during a time interval. It is described by:

$$T_j^{i,n}.aload = T_j^{i,n}.residence * T_j^{i,n}.etime$$

"Relative transaction load" of a transaction type represents the ratio of its transaction load to all types of transaction load on the hosting node during the measurement interval.

$$T_j^{i,n}.rload = \frac{T_j^{i,n}.aload}{T_k^{l,n}.aload}$$

"Relative transaction density" represents the density of a type of transaction with respect to its relative transaction load. It is described by:

$$T_j^{i,n}.rdensity = \frac{T_j^{i,n}.adensity}{T_k^{i,n}.rload}$$

"Transaction Saturation Rate." This metrics indicates if and how much a specific type of transaction is overloaded on a node. It is the ratio of the relative transaction density to the transaction density specified in the QoS agreements:

$$T_j^{i,n}.saturation = \frac{T_j^{i,n}.rdensity}{T_j^{i,n}.density}$$

"Node Saturation Rate." The metrics indicates if and how much a node is overloaded. This is the ratio of the sum of the density of each type of transaction on a node to the sum of the weighted density agreements, according to the measured transaction load distributions. The metrics is defined as:

$$N_n.saturation = \frac{T_j^{i,n}.adensity}{T_j^{i,n}.density * T_j^{i,n}.rload}$$

"Transaction Weight" indicates how the workload for a type of transaction should be distributed among the hosting nodes. The initial value is the capacity of the hosting node. The next section will describe how this designation can be changed and used by the control mechanism:

$$T_j^{i,n}.weight = \overline{\omega}, 0 \leq \overline{\omega} \leq 1$$

Control

The QoS controller 90 OF FIG. 3 triggers actions, when performance, availability and reliability issues arise, to guarantee quality of service. There are two types of actions: automated and non-automated. If a performance, availability or reliability agreement for a service/transaction is violated on either a single node 34, 36 and 38 or the whole cluster, it usually means that at least one of the following problems occurred:

(1) The workload on a node or the cluster is overloaded, thus load redistribution or adding new resources is needed;
(2) The quality of the application software is not acceptable, thus needs to be re-engineered;
(3) The system is not configured or set up properly; or
(4) One or more system components are malfunctioning, and need to be repaired or replaced.

In this section, the focus is on what automated actions can be taken in some embodiments when potential performance or availability/reliability problems occur. In the model, transaction requests are dispatched to different hosting hosts in a weighted round-robin fashion. In implementation, a request mapping table can be built, where each type of transaction with a specific service and a user type has an entry. This is shown as step 124 in FIG. 7. The entry in the table contains a node index and the transaction weight on each of the hosting nodes. The node index is computed using the transaction weights. It indicates the node to which the next request for this type of transaction will be dispatched, unless the corresponding queue is full. When a performance bottleneck occurs or a QoS agreement is violated, the transaction loads may be re-adjusted among the hosting nodes, or are distributed to new nodes if necessary and possible. Then, the corresponding transaction weights are re-calculated. The new weights are used to route transaction requests for the new time interval. In the model, the ways to detect potential performance or availability/reliability problems (step 126) include monitoring whether:

(1) The average response time for a type of transaction measured on a node is greater than that specified in the agreement;
(2) The transaction compliance rate is not satisfied (i.e., the transaction violation rate is higher than expected); and
(3) The transaction/node saturation rates are unbalanced in the system, even if there are no QoS violations.

There are basically three causes to the problems: (1) transactions on a node are overloaded, (2) transaction loads are unbalanced among the hosting nodes, or (3) a node (or some of its components) is malfunction (e.g., system-hang, low-memory due to memory leaks, etc.). In order to diagnose the cause of the problem, the transaction saturation rate for each type of transaction on each hosting node is checked, starting from higher priority transactions and progressing toward lower priority ones.

Transaction Level Guarantees

Figure 7:
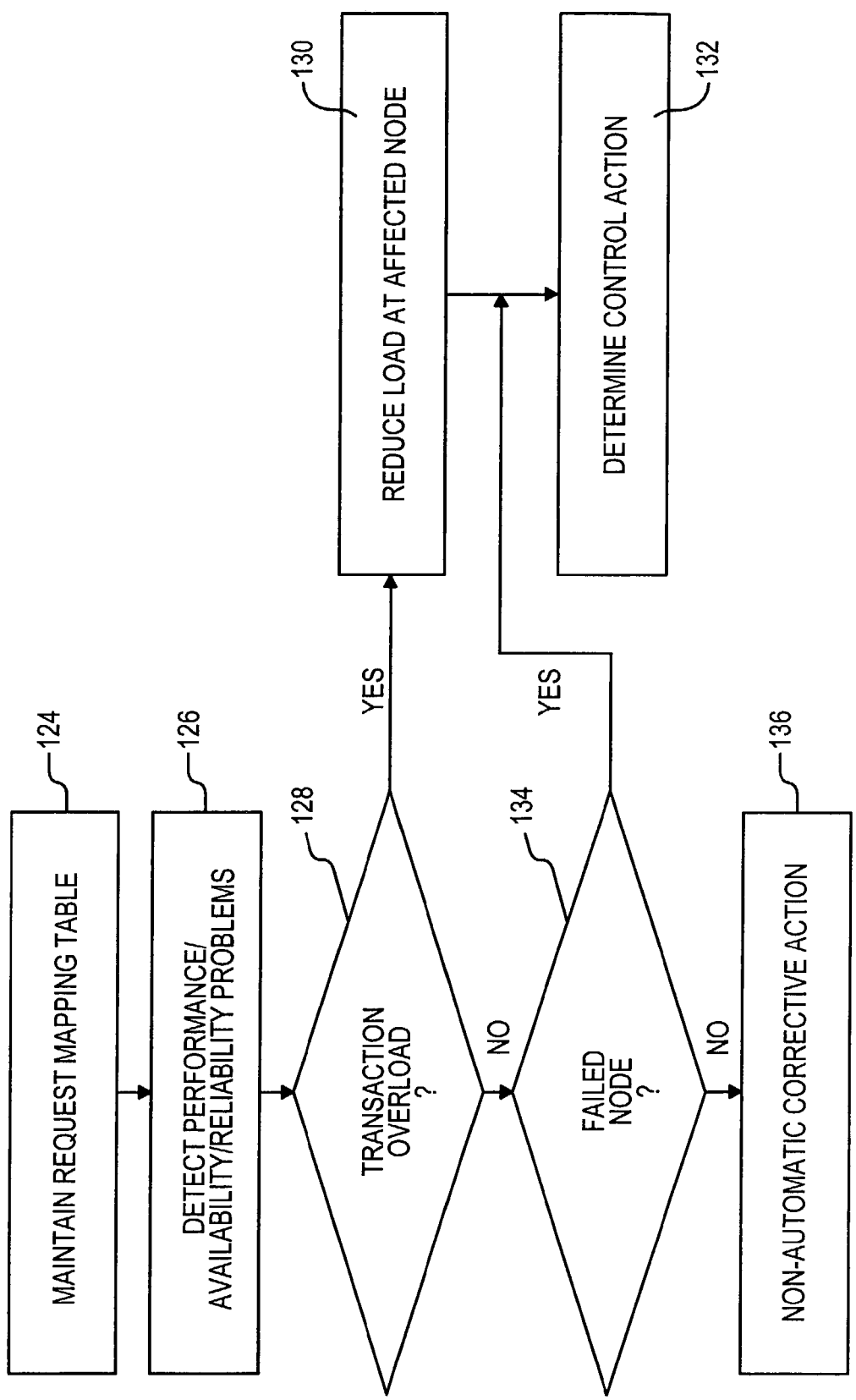
FIG. 7 is a process flow of steps for identifying and remedying QoS concerns in accordance with embodiments of the invention.

At step 128 of FIG. 7, if $T_j^{i,n}.saturation > 1$, it indicates that transactions with type $T_j^i$ are overloaded on node $N_n$. The overload, in terms of transaction density and transaction count, is calculated as:

$$\partial = \frac{T_j^{i,n}.rdensity - T_j^{i,n}.density}{T_j^{i,n}.rdensity}$$

and $$\Delta = \min(T_j^{i,n}.curr\_start, \partial * T_j^{i,n}.residence)$$

An overload indicates that the transaction density for $T_j^{i,n}$ should be reduced by $\partial$ for the new time interval, so that the response time agreement could be satisfied. The load reduction at step 130 may involve a sequence of substeps. The absolute transaction load for $T_j^{i,n}$ should be modified as:

$$T_j^{i,n}.aload = T_j^{i,n}.aload * \theta$$

where $$\theta = 1 - \frac{\Delta}{T_j^{i,n}.residence}$$

As a result, the relative transaction load for each type of transaction hosted on $N_n$ needs to be adjusted, using the formula for relative transaction load. Further, $T_j^{i,n}$'s absolute density should be changed as:

$$T_j^{i,n}.adensity = \frac{T_j^{i,n}.residence - \Delta}{intvl.end - intvl.start}$$

Then, the relative density and saturation rate for each type of transaction hosted on $N_n$ needs to be adjusted, using the density and saturation formulas, respectively. Finally, $N_n$.saturation is re-calculated using its formula.

To reduce $T_j^{i,n}$'s load on $N_n$, the transaction weight for $T^{j,n}$ must also be adjusted accordingly, and it is calculated as:

$$T_j^{i,n}.weight = T_j^{i,n}.weight\left(1 - \frac{\Delta}{T_j^{i,n}.curr\_start}\right)$$

After quantifying the overload, an appropriate control action is determined at step 132. As previously noted, when referring to step 98 in FIG. 4, there are three possible scenarios: (1) Other hosting nodes can absorb the load (load balancing); (2) Some nodes that did not previously host the type of transaction can absorb the load (or adding new nodes); and (3) No other nodes can handle this overload without sacrificing the performance of their hosted transactions (graceful degradation).

Load Balancing

In the first of the three scenarios, it is assumed that there are m nodes and conditions are such that (1) each of these nodes is not saturated, and (2) $T_j^i$ is not saturated on each of these nodes.

$\forall k \in \Omega(m), N_k.saturation<1$ and $T_j^{i,k}.saturation<1$

The overload is distributed among the m nodes such that the resulting transaction and node saturation rates on each node are not greater than 1 (one simple strategy would be to equally distribute the load, if possible). Suppose that the quota $N_k$ receives is $\Delta'$ out of $\Delta$, the absolute transaction load for $T_j^{i,n}$ should be modified as:

$$T_j^{i,k}.aload = T_j^{i,k}.aload * \theta' \text{ where } \theta' = 1 + \frac{\Delta'}{T_j^{i,k}.residence}.$$

As a result, the relative transaction load for each type of transaction hosted on $N_k$ needs to be adjusted, using the formula for relative transaction load. Further, $T_j^{i,n}$'s absolute density should be changed as:

$$T_j^{i,k}.adensity = \frac{T_j^{i,k}.residence + \Delta'}{intvl.end - intvl.start}$$

Then, the relative density and saturation rate for each type of transaction hosted on $N_k$ needs to be adjusted, using the density and saturation formulas respectively. Finally, $N_k$.saturation is re-calculated using its formula.

To increase $T_j^{i,n}$'s load on $N_k$, the transaction weight for $T_j^{i,k}$ must also be adjusted accordingly, and it is calculated as:

$$T_j^{i,k}.weight = T_j^{i,k}.weight\left(1 + \frac{\Delta'}{T_j^{i,k}.curr\_start}\right)$$

After re-distributing the overload, the transaction weight for $T_j^{i,n}$ on each hosting node is normalized as follows:

$$\forall k, T_j^{i,k}.weight = \frac{T_j^{i,k}.weight}{\max(\Omega(T_j^{i,k}.weight))}$$

where $\Omega(T_j^{i,k}.weight)$ is the set of transaction weights and function max returns the maximum value.

Adding New Nodes

In the second scenario, suppose that there are K nodes that currently do not host $T_j^i$ and that meet the following condition: each node and its hosted transactions, if any, are not saturated (for a new node, its saturation rates are zero). then $\forall k \in \Omega(K), N_k.saturation>1$ and $\forall l,m, T_m^{l,k}.saturation>1$ The overload is distributed among the K nodes such that the resulting saturation rate of each node would not be greater than 1 and such that the saturation rates of all the nodes are as close as possible. Suppose that the quota $N_k$ receives is $\Delta'$ out of $\Delta$, the absolute transaction load for $T_j^{i,k}$ on $N_k$ would be:

$$T_j^{i,k}.aload = \Delta' * \frac{(T_j^{i}.resptime - T_m^{l,k}.wtime)T_j^{i,n}.etime}{T_j^{i,n}.stime}, T_j^i \neq T_m^l$$

For a new empty node, $T_m^{l,k}.wtime$ is not available, and $T_j^{i,n}.wtime$ is used instead. As a result, the relative transaction load for each type of transaction hosted on $N_k$ needs to be adjusted, using the formula for relative transaction load. Further, $T_j^{i,k}$'s density should be calculated as:

$$T_j^{i,k}.adensity = \frac{\Delta'}{intvl.end - intvl.start}$$

Then, the relative density and saturation rate for each type of transaction hosted on $N_k$ needs to be adjusted, using the density and saturation formulas respectively. Finally, $N_k$.saturation is re-calculated using its formula.

As $N_k$ takes $\Delta'$ out of the total overload $\Delta$, the transaction weight for $T_j^i$ on $N_k$ should be set to:

$$T_j^{i,k}.weight = T_j^{i,n}.weight\frac{\Delta'}{T_j^{i,n}.curr\_start - \Delta}$$

After re-distributing the overload, the transaction weight for $T_j^i$ on each hosting node is normalized as described in the first scenario.

Graceful Degradation

In the third scenario, where each node in the system is saturated, the selected control action at step 132 of FIG. 7 is to "squeeze" the resources for the lower-priority transactions. Therefore, the performance of these low-priority transactions will be degraded. The intent is to force an equivalent amount of load for some lower-priority transactions to other hosting nodes, if each of the affected transactions, $T_m^{l,n}$, meets the following conditions:

(1) The transaction has a lower priority; and
(2) There exists another hosting node $N_k$ for $T_m^l$ where the priority of each hosted transaction is less than that of $T_j^i$.

To simplify the discussion, it is assumed that $T_m^{l,n}$ is the only transaction satisfying the above conditions. An equivalent amount of load for $T_m^{l,n}$ is displaced from $N_n$, and moved to $N_k$. That is:

$$\Delta' = \frac{\Delta * T_j^{i,n}.etime}{T_m^{l,n}.etime}$$

The same algorithms used in the first scenario can be used here to adjust the relevant metrics on $N_n$ and $N_k$. Note that the "squeeze" strategy can also be used as an alternative to the algorithms described in the second scenario. The only difference is, each squeezed $T_m^{l,n}$ should meet the condition: There exists at least another hosting node $N_k$ for $T_m^l$ where neither $N_k$ nor $T_m^{l,k}$ is saturated, $N_k$.saturation<1 and $T_m^{l,k}$.saturation<1.

The time complexity relating to the above algorithms for redistributing $T_j^i$'s load should be considered. Let n be the number of nodes where $T_j^i$ is overloaded, and m be the number of nodes that can absorb extra load. Let k be the maximum number of transactions hosted on a node. Since transaction load, density, and saturation rate, for each type of transaction on both source and destination nodes, need to be re-computed, the time complexity of redistributing $T_j^i$'s load among the n and m nodes is O(nmk). If l is the number of transaction types in the system whose loads need to be redistributed, the time complexity of the algorithms is O(nmkl). Let N be the total number of nodes in the system, and T be the total number of transaction types in the system. As n≦N, m≦N, and k≦T, l≦T. the complexity of the algorithms is bounded by $O(N^2 T^2)$.

Encountering Failing Nodes

In FIG. 7, when it is determined at decision step 128 that the cause of a detected performance/availability/reliability problem is not transaction overload, the process advances to the step 134 of determining whether the cause is a failed node. A second negative response at step 134 may trigger an alert to persons able to provide non-automatic corrective action at step 136. As previously noted, the possible non-automatic actions include system reconfiguration and software programming.

At steps 128 and 134, if $T_j^{i,n}$'s response time agreement is violated and $T_j^{i,n}$.saturation<1, it indicates that the violation is not caused by the overload. Instead, there might be some related system and/or software components that are not performing normally (e.g., system-hang, low-memory due to memory leaks, etc.). When such a situation occurs, an alarm should be generated, since the problematic component may need to be repaired or replaced. Moreover, $T_j^{i,n}$'s weight should be adjusted so that the situation will not deteriorate (at least not as fast). Thus, there may be a combination of automatic and non-automatic corrective action. It should be noted that adjustment may not be accurate, because it is difficult to quantify the impact that a fault imposes on the resources.

If $T_j^{i,n}$.inprog≠0, it indicates that there are instances of $T^{i,n}$ which are still in-progress. $T_j^{i,n}$'s weight should temporarily be set to 0. If the in-progress transactions can finish successfully, $T_j^{i,n}$'s weight will be set to an empirical value lower than its previous weight (e.g., $T_j^{i,n}$.weight=$T_j^{i,n}$.weight/2). Otherwise, the problem must be fixed before $T_j^{i,n}$ can service any new requests.

If $T_j^{i,n}$.inprogr=0 and $T_j^{i,n}$.failed≠0, it indicates that some instances of $T_j^{i,n}$ have failed during the current measurement interval. $T_j^{i,n}$ should not service any new request before the problem is fixed. Thus, its weight is set to zero.

If $T_j^{i,n}$.inprogr=0 and $T_j^{i,n}$.failed=0, it indicates that no failures have occurred during the current measurement interval. But the hosting node is not performing normally, as indicated by the response time violation. Thus, before the problem is fixed, $T_j^{i,n}$'s weight should be reduced to a lower empirical value. After adjusting $T_j^i$'s weight, the transaction weight for $T_j^i$ on each hosting node should be normalized as described before.

Next, briefly consider the time complexity of the above algorithm. Let m be the number of nodes where $T_j^i$'s response time agreement is violated, and n be the number of nodes hosting $T_j^i$. The time complexity of adjusting and normalizing $T_j^i$'s weights on its hosting nodes is O(m+n). Let l be the number of troubled transaction types in the system, the complexity of the algorithm is O((m+n)l), and it is bounded by O(NT), where N is the total number of nodes in the system, and T is the total number of transaction types in the system.

Figure 8:
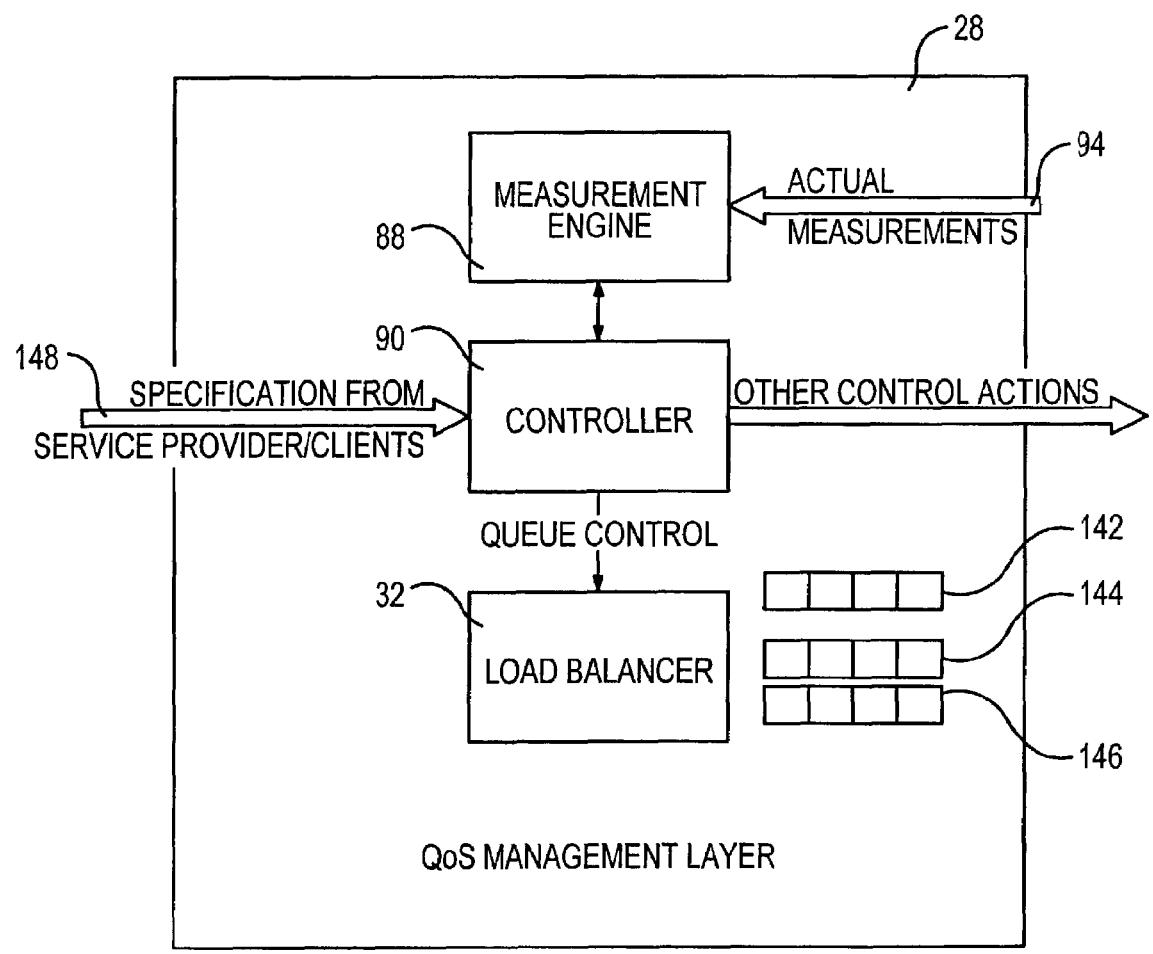
FIG. 8 is a block diagram of the QoS management layer of FIG. 2, but with on-board queues in accordance with embodiments of the present invention.

Referring now to FIG. 8, the components for implementing the control actions in accordance with one embodiment of the invention are shown. In this embodiment, the queues 142, 144 and 146 are contained within the QoS management layer 128. Each queue is dedicated to one of the application servers, such as the servers 34, 36 and 38 of FIG. 2.

The measurement engine 88 collects data regarding the instrumented e-services, so that the QoS management layer 28 is able to correlate actual measurements 94 to the corresponding QoS specifications 148 received from the service providers 40 and 42 and from the clients 46 and 48. As one possibility, an Observer may be used to obtain management data from the instrumented e-services in order to provide the measurements 94. The measurement engine 88 and the controller 90 are cooperative to perform correlations. Correlated data is maintained regarding transactions of various service instances at both the transaction type level and the transaction instance level.

The measurement engine 88 may be used to calculate lower level metrics, while the controller 90 calculates the higher level metrics. The lower level metrics determined by the measurement engine may include "transaction response times" and "transaction/node saturation rates." These business level metrics are calculated using raw counters in the management engine and are used by the controller to meet guaranteed QoS specifications by allocating, balancing, guaranteeing or reserving resources for prioritized services and transactions. The higher level metrics calculated by the controller 90 may be directly related to performance requirements, availability requirements and reliability requirements. These higher level metrics are meta variables derived from the basic measurement data collected via the measurement engine. The correlation process involves comparing the real time values to the specified values corresponding to the specifications 148 from the service providers and from the clients.

An advantage of the invention is that the QoS management considers availability and reliability aspects in addition to considering performance aspects of an e-service aggregator. Another advantage is that the system and method differentiate between transactions and services. As a result, measurement and control granularity is at the transaction or service level, rather than at the node, application, process or thread level. The present invention utilizes a novel set of transaction-based QoS metrics that provide a desirable perspective to managing and controlling the work load in a distributed system. Moreover, the above-described algorithm for load prioritization and balancing facilitates run time identification and correction of detected performance, availability and/or reliability problems.

What is claimed is:

1. A processor-based Quality of Service (QoS) management system for identifying and at least partially remedying degradation with respect to satisfaction of predefined QoS standards comprising:
   a measurement engine configured to acquire data specific to transaction instances of transaction types during executions of a plurality of services via a plurality of application nodes of a service-based system, said services being defined by different sets of transaction types, said measurement engine being enabled to generate transaction data indicative of individual measures relating to processing for particular said transaction instances and indicative of aggregate measures relating to processing for a plurality of said transaction instances, said individual measures including data specific to finished said particular transaction instances, said aggregate measures including data specific to counts of occurrences of specific said transaction types on a basis of time; and
   a controller in communication with said measurement engine, said controller being enabled to compare said transaction data from said measurement engine to said predefined QoS standards and to adaptively adjust operational parameters of said service-based system in response to current relationships between said transaction data and said predefined QoS standards, said controller being configured to provide adaptive adjustments of said operational parameters in response to detections of said degradation with respect to satisfaction of said redefined QoS standards.

2. The QoS management system of claim 1 wherein said measurement engine is connected to each of said application nodes to access transaction level information for each of a plurality of independent electronic services (e-services), said application nodes being application servers of a Web portal site to which said QoS management system is dedicated.

3. The QoS management system of claim 1 wherein said measurement engine and said controller are cooperative to be responsive to a preselected prioritization of said transaction types, such that said adaptive adjusting of operational parameters is partially based on said preselected prioritization.

4. The QoS management system of claim 3 wherein said measurement engine and said controller are further cooperative to be responsive to a defined prioritization of said services, such that said adaptive adjusting is further based on said defined prioritization.

5. The QoS management system of claim 1 wherein said measurement engine and said controller are implemented in software of a QoS management layer of a portal which provides e-services via the World Wide Web (WWW).

6. The QoS management system of claim 1 wherein, as a response to said detections of degradations said controller is enabled to implement control actions that include a plurality of:
   (1) dynamically varying load distribution among said application nodes with respect to processing said transaction instances of said transaction types;
   (2) increasing a pool of said application nodes which are currently hosting selected said services, where said increasing is a conditioned response to determining that an overload threshold has been reached in hosting said selected services; and
   (3) intentionally degrading performances of executions of low priority transaction types as a conditioned response to determining that an overload threshold has been reached with respect to available resources.

7. The QoS management system of claim 1 wherein said measurement engine and controller are cooperative to identity and at least partially remedy degradation with respect to each of:
   (1) performance of said transaction instances, including response times for executing said transaction instances of specific said transaction types at various said application nodes;
   (2) availability of resources to execute said transaction instances of particular said transaction types; and
   (3) reliability in successfully executing finished said transaction instances of different specific said transaction types.

8. The QoS management system of claim 1 wherein said measurement engine is configured to monitor and generate separate said transaction data for different transaction types that include "login," "search," "add to cart," and "buy" transactions.

9. A method of providing management for a service-based system comprising:
   employing a plurality of operationally independent application nodes to execute different electronic services (e-services), each said e-service being associated with a set of transactions and being executed by processing instances of said transactions;
   identifying processing of said instances at said application nodes while said instances are executing on a basis of a specification of QoS agreements between said different e-services and said service-based system;
   measuring transaction level metrics in real time executions of said e-services, said transaction level metrics being specific to processing of said instances at said application nodes on said basis of said specification of QoS agreements;
   generating transaction level data from said measuring such that is said transaction level data is indicative of Quality of Service (QoS) for each said e-service and for each said application node during a measurement interval;
   comparing said transaction level data to said specification of said QoS agreements of said e-services; and
   adaptively adjusting operational parameters for said plurality of application nodes in response to detecting predefined conditions of said transaction level data during said comparing.

10. The method of claim 9 wherein said comparing includes distinguishing said QoS for individual said e-services, wherein said QoS for an individual said e-service is determined using the QoS agreement associated with said individual e-service and using a portion of said transaction level data identified as being related to said individual e-service.

11. The method of claim 10 wherein said portion of said transaction level data to be used in determining said QoS of said individual e-service is identified by associating each said instance of said transactions with one of said e-services being accessed in implementing said instance.

12. The method of claim 10 further comprising negotiating said QoS agreements with service providers in configuring said service-based system.

13. The method of claim 9 further comprising prioritizing said transactions and utilizing said prioritizing while adaptively adjusting said operational parameters, such that said instances of higher priority transactions are preferentially processed in managing QoS within said service-based system.

14. The method of claim 13 further comprising prioritizing said e-services and utilizing said prioritizing while adaptively adjusting said operational parameters, such that said instances of higher priority e-services are preferentially processed in managing QoS within said service-based system.

15. The method of claim 9 wherein said adaptive adjusting includes implementing control actions in response to detections of degradation of QoS such that said QoS agreements are not satisfied, said control actions including a plurality of:
  (1) dynamically varying load distribution among said application nodes in response to detecting an overload condition with respect to processing said instances within at least one said application node;
  (2) increasing a pool of said application nodes that are currently hosting a particular said service in response to detecting that said QoS of said particular service is below a specific QoS level; and
  (3) intentionally degrading performances of executions of low priority said transactions in response to detecting a processing overload condition with respect to available resources.

16. The method of claim 9 wherein said step of generating said transaction level data includes monitoring metrics indicative of each of:
  (1) performances in processing said instances, including response times;
  (2) current availability of resources with respect to processing said instances of transactions for specific said e-services; and
  (3) reliability in successfully processing finished said instances for individual said e-services.

17. A service-based portal comprising:
  a source of Internet connectivity;
  a plurality of application servers commonly accessible via said Internet connectivity, said application servers having stored electronic services (e-services) defined by transaction types, such that executions of transaction instances of said transaction types implement said e-services, said transaction instances being executed by said application servers in response to requests received via said Internet connectivity and in accordance with QoS agreements of individual said e-services; and
  a quality of service manager connected between said source of Internet connectivity and said application servers to monitor and control quality of service for each said e-service, said manager including:
    (1) a measurement monitor enabled to determine execution metrics for said transaction types of each said e-service, said execution metrics including measures of transaction durations and counts of transaction failures, and
    (2) a controller enabled to enforce adaptive control actions in response to determinations by said manager that said execution metrics indicate that said transaction instances for at least one said e-service are currently executing at a level below a preferred quality of service, said measurement monitor and controller being cooperative with said application servers to provide real time determinations of executions of specific said transaction instances at specific said application servers.

18. The portal of claim 17 wherein said application servers are located at a common site and wherein said manager has access to QoS agreements for each said e-service, each said QoS agreement being indicative of said predefined quality of service for a specific said e-service.

19. The portal of claim 17 wherein said manager is enabled to:
  (1) collect management information regarding transaction types for said transaction instances executed at individual said application servers;
  (2) collect management information regarding processing of each said transaction instance executed at individual said application servers; and
  (3) collect management information indicative of each instance of executing each said e-service, such that said manager monitors and identifies activity at said application servers at a transaction level and an e-service level.

20. The portal of claim 19 wherein said controller is configured to be responsive to a prioritization at said transaction level and a prioritization at said e-service level.

21. A Quality of Service (QoS) management system comprising:
  measuring means operatively associated with a service-based system that provides a plurality of services in which each said service is defined by a plurality of transaction types, said measuring means being configured to acquire data specific to transaction instances of each said transaction type, said measuring means further being configured to generate transaction data indicative of individual measurements related to processing particular said transaction instances and indicative of aggregate measurements relating to processing for a plurality of said transaction instances, said individual measurements including data specific to finished said particular transaction instances, said aggregate measurements including data specific to counts of occurrences of specific said transaction types on a basis of time; and
  controller means cooperative with said measuring means for comparing said transaction data to predefined QoS standards and for adaptively adjusting operational parameters of said service-based system in response to current relationships between said transaction data and said predefined QoS standards, said controller being configured to provide adaptive adjustments of said operational parameters in response to detections of degradations with respect to satisfaction of said predefined QoS standards.

22. The QoS management system of claim 21 wherein said measuring means is coupled to a plurality of application nodes of said service-based system in order to acquire said transaction data, each said application node being programmed to execute more than one of said services.

23. The QoS management system of claim 22 wherein said controller means is configured to activate and deactivate each said application node with respect to executing particular said services, said activating and deactivating being based on said current relationships between said transaction data and said predefined QoS standards.

* * * * *

UNITED STATES PATENT AND TRADEMARK OFFICE
CERTIFICATE OF CORRECTION

PATENT NO. : 7,349,340 B2
APPLICATION NO. : 10/464593
DATED : March 25, 2008
INVENTOR(S) : Akhil Sahai et al.

It is certified that error appears in the above-identified patent and that said Letters Patent is hereby corrected as shown below:

In column 13, line 16, delete " $T^{ji,n}$ " and insert -- $T_j^{i,n}$ --, therefor.

In column 13, line 37, delete " $(T_j^i.resptime - T_m^{l,k}.wtime)$ " and insert -- $(T_j^i.resptime - T_m^{l,k}.wtime)$ --, therefor.
(Specification filed on Jun. 18, 2003, page 24, line 20)

In column 15, lines 29-30, delete " $T_m^{l,k}.saturation<1$ " and insert -- $T_m^{l,k}.saturation < 1$ --, therefor.

In column 16, line 5, delete " $T^{ji,n}$ " and insert -- $T_j^{i,n}$ --, therefor.

In column 17, line 48, in Claim 1, delete "redefined" and insert -- predefined --, therefor.

In column 18, line 4, in Claim 6, after "degradations" insert -- , --.

In column 18, lines 20-21, in Claim 7, delete "identity" and insert -- identify --, therefor.

In column 18, line 54, in Claim 9, after "that" delete "is".

Signed and Sealed this

Twenty-sixth Day of August, 2008

JON W. DUDAS
*Director of the United States Patent and Trademark Office*